US012493261B2

(12) United States Patent
Maejima et al.

(10) Patent No.: US 12,493,261 B2
(45) Date of Patent: Dec. 9, 2025

(54) IMAGE FORMING APPARATUS

(71) Applicant: CANON KABUSHIKI KAISHA, Tokyo (JP)

(72) Inventors: Mika Maejima, Tokyo (JP); Ryuji Hamasaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/821,941

(22) Filed: Aug. 30, 2024

(65) Prior Publication Data

US 2025/0076808 A1 Mar. 6, 2025

(30) Foreign Application Priority Data

Sep. 6, 2023 (JP) ................................ 2023-144454

(51) Int. Cl.
*G03G 15/00* (2006.01)
*G03G 21/16* (2006.01)

(52) U.S. Cl.
CPC ......... *G03G 15/80* (2013.01); *G03G 21/1633* (2013.01); *G03G 21/1652* (2013.01)

(58) Field of Classification Search
CPC ............... G03G 15/80; G03G 21/1633; G03G 21/1652; B41J 2/1752; B41J 29/02; B41J 29/13; B41J 29/38
USPC .................................................... 399/90, 108
See application file for complete search history.

(56) References Cited

U.S. PATENT DOCUMENTS

2011/0203470 A1* 8/2011 Oyama .............. G03G 15/5016 101/480

FOREIGN PATENT DOCUMENTS

| | | | |
|---|---|---|---|
| CN | 113448204 | A * | 9/2021 |
| JP | 2017019240 | A | 1/2017 |
| JP | 2020127198 | A | 8/2020 |
| JP | 2021070264 | A | 5/2021 |
| JP | 2022144023 | A | 10/2022 |

* cited by examiner

*Primary Examiner* — Hoan H Tran
(74) *Attorney, Agent, or Firm* — Canon U.S.A., Inc. IP Division

(57) ABSTRACT

An image forming apparatus to which an accessory unit including an accessory connector is detachably attachable includes a top cover including a stacking unit on which a recording medium is to be stacked and a unit attachment portion to which the accessory unit is attachable, a device connector that is disposed on a unit attachment portion and is connectable to the accessory connector, and an operation unit including an input unit configured to receive an input operation. The top cover includes a first cover end with respect to a width direction. The operation unit and the unit attachment portion are disposed between the first cover end and the stacking unit, and the unit attachment portion is disposed downstream of the operation unit in a predetermined direction as viewed in the vertical direction in a state where the input unit faces in the predetermined direction.

17 Claims, 9 Drawing Sheets

(Y-Y)

IMAGE FORMING APPARATUS

BACKGROUND

Field

The present disclosure relates to an image forming apparatus that forms an image on a recording medium.

Description of the Related Art

Some image forming apparatuses are provided with an operation unit for a user to perform an operation such as setting the image forming apparatus. There are some image forming apparatuses to which peripheral devices are attachable.

According to Japanese Patent Application Laid-Open No. 2020-127198, an image forming apparatus includes an operation unit and an attachment portion to which peripheral devices, such as a numeric keypad unit and an integrated circuit (IC) card reader, are to be attached.

SUMMARY

The present disclosure is directed to the provision of an image forming apparatus in which an operation unit and an attachment portion to which an accessory unit as a peripheral device is to be attached are suitably arranged. The present disclosure is also directed to the provision of an image forming apparatus in which an operation unit and a portion in which a connector connected to a control unit is disposed are suitably arranged.

According to some embodiments, an image forming apparatus to which an accessory unit including an accessory connector is detachably attached, includes a top cover including a stacking unit on which a recording medium is to be stacked, an upper surface facing upward in a vertical direction, and a unit attachment portion to which the accessory unit is attachable, a device connector to which the accessory connector is connectable, the device connector being disposed on the unit attachment portion, a discharge unit configured to discharge the recording medium in a discharge direction toward the stacking unit, an operation unit including an input unit configured to receive an input operation; and a control unit connected to the device connector. The top cover includes a first cover end and a second cover end opposite to the first cover end with respect to a width direction orthogonal to the vertical direction and the discharge direction, and the operation unit and the unit attachment portion are disposed between the first cover end and the stacking unit in the width direction. The unit attachment portion is disposed downstream of the operation unit in a predetermined direction as viewed in the vertical direction in a state where the input unit faces the predetermined direction. The unit attachment portion has a plurality of walls that forms a recess portion recessed downward from the upper surface, the plurality of walls includes a first wall and a second wall that extend in a direction intersecting with the width direction, the first wall is closer to the stacking unit than to the second wall in the width direction, and the device connector is disposed on the first wall.

According to some other embodiments, an image forming apparatus includes a top cover including a stacking unit on which a recording medium is to be stacked, an upper surface facing upward in a vertical direction, and a recess portion recessed downward from the upper surface, a discharge unit configured to discharge the recording medium in a discharge direction toward the stacking unit, an operation unit including an input unit configured to receive an input operation, a connector disposed on the recess portion, a control unit connected to the connector, and a cover covering the recess portion to cover the connector. The top cover includes a first cover end and a second cover end opposite to the first cover end with respect to a width direction orthogonal to the vertical direction and the discharge direction, the operation unit and the recess portion are disposed between the first cover end and the stacking unit in the width direction. The recess portion is disposed downstream of the operation unit in a predetermined direction as viewed in the vertical direction in a state where the input unit faces the predetermined direction. The top cover has a plurality of walls that forms the recess portion, the plurality of walls includes a first wall and a second wall that extend in a direction intersecting with the width direction, the first wall is closer to the stacking unit than to the second wall in the width direction, and the connector is disposed on the first wall.

Further features of the present disclosure will become apparent from the following description of exemplary embodiments with reference to the attached drawings.

DESCRIPTION OF THE EMBODIMENTS

Figure 1:
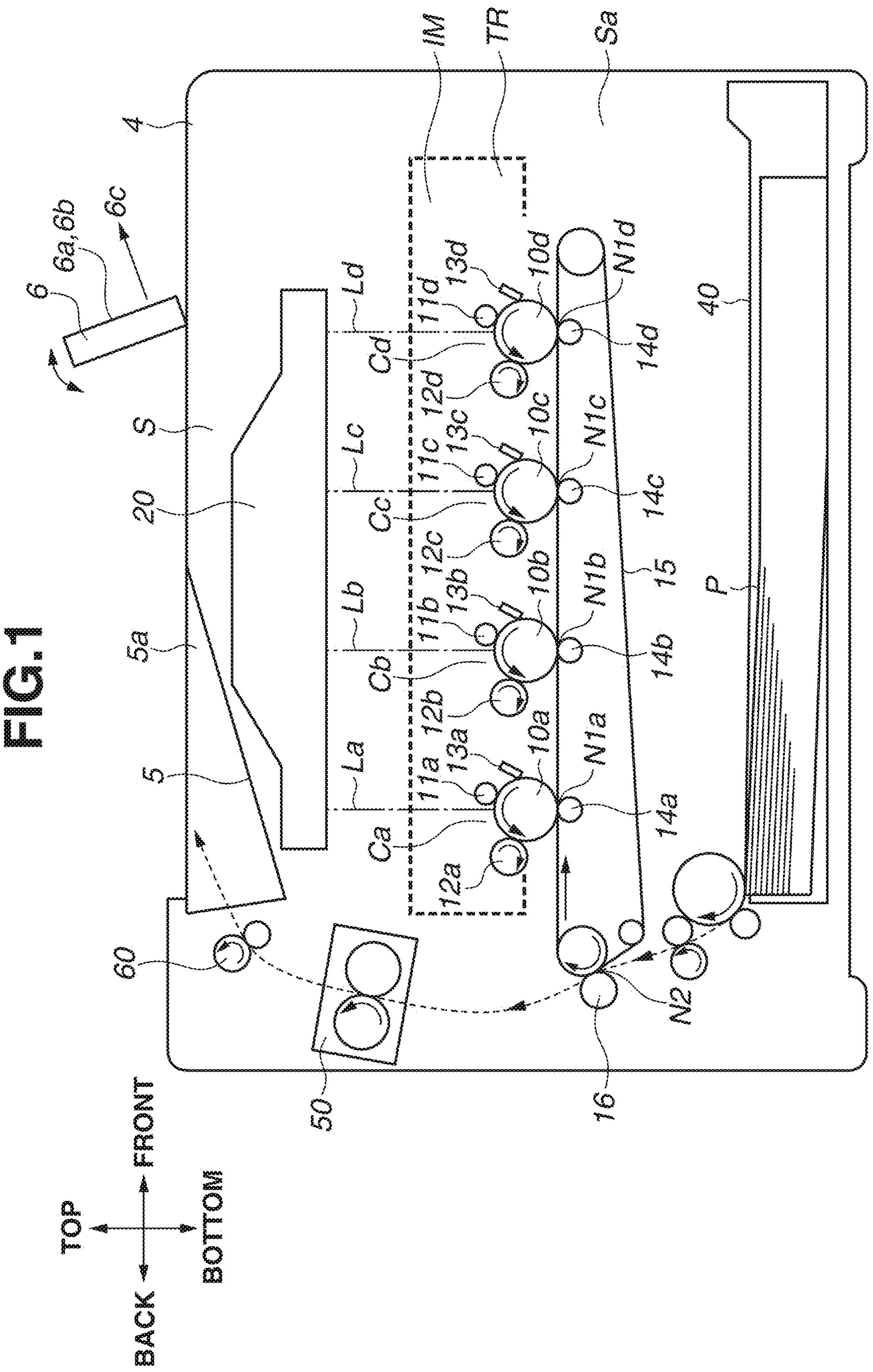
FIG. 1 is a schematic sectional view of an image forming apparatus.

Various exemplary embodiments, features, and aspects of the present disclosure will be described in detail below with reference to the attached drawings. However, constituent components described in the following exemplary embodiments can be appropriately modified in their dimensions, materials, shapes, and relative arrangements according to a configuration and various conditions of an apparatus to which the present disclosure is applied. Thus, unless otherwise specifically stated, the below-described exemplary embodiments are not intended to limit the scope of the present disclosure only thereto.

In the following description, an up-and-down direction, a front-and-back direction, and a right-and-left direction are defined as follows in relation to an upper side, a lower side, a front side, a back side, a left side, and a right side, respectively. The up-and-down direction, the front-and-back direction, and the right-and-left direction intersect each other and are orthogonal to one another according to the present exemplary embodiment. According to the present exemplary embodiment, the up-and-down direction is parallel to the vertical direction (direction of gravity), and the front-and-back direction and the right-and-left direction are parallel to the horizontal direction. The left and right sides in the right-and-left direction are defined based on a state where an image forming apparatus S is viewed from the front side.

Overall Configuration of Image Forming Apparatus

An overall configuration of the image forming apparatus S is described with reference to FIG. 1 which is a schematic sectional view of the image forming apparatus S. According to the present exemplary embodiment, the image forming apparatus S is a tandem type laser beam printer adopting an electrophotographic method and can form four color images on a sheet-like recording medium, such as paper or an overhead projector (OHP) sheet.

An image forming unit of the image forming apparatus S is now described. The image forming unit includes photoconductive drums 10*a*, 10*b*, 10*c*, and 10*d* serving as electrophotographic photoreceptors. The image forming unit further includes charging rollers (charging members) 11*a*, 11*b*, 11*c*, and 11*d*, developing rollers (developing members) 12*a*, 12*b*, 12*c*, and 12*d*, and cleaning blades (cleaning members) 13*a*, 13*b*, 13*c*, and 13*d*.

In the following description, if there are a plurality of similar components, such as the photoconductive drums 10*a* to 10*d*, one of them may be described without its subscript (e.g., the photoconductive drum 10).

Each of the photoconductive drums 10*a* to 10*d* includes an aluminum cylinder and a photoconductive layer of an organic photoconductor (OPC) disposed on an outer circumferential surface of the aluminum cylinder.

The charging rollers 11*a* to 11*d* are configured to respectively charge the photoconductive drums 10*a* to 10*d*. Each of the charging rollers 11*a* to 11*d* includes a core metal and a conductive elastic member disposed around the core metal.

The photoconductive drums 10*a* to 10*d* are driven to rotate in a direction of arrows (counterclockwise in FIG. 1) by a driving unit (not illustrated). The charging rollers 11*a* to 11*d* come into contact with surfaces of the photoconductive drums 10*a* to 10*d* and are rotated by the photoconductive drums 10*a* to 10*d*. A charging bias is applied to the charging rollers 11*a* to 11*d* from a power supply (not illustrated).

According to the present exemplary embodiment, the image forming apparatus S includes an image forming unit IM. The image forming unit IM includes the photoconductive drums 10*a*, 10*b*, 10*c*, and 10*d*. The image forming unit IM further includes the charging rollers (charging members) 11*a*, 11*b*, 11*c*, and 11*d*, the developing rollers (developing members) 12*a*, 12*b*, 12*c*, and 12*d*, and the cleaning blades (cleaning members) 13*a*, 13*b*, 13*c*, and 13*d*.

The image forming unit IM is movable between an inside and an outside of an apparatus main body Sa of the image forming apparatus S. According to the present exemplary embodiment, the image forming unit IM is moved forward in the front-and-back direction and thus is moved from the inside to the outside of the apparatus main body Sa.

According to the present exemplary embodiment, the image forming unit IM includes a cartridge support member (tray) TR that is movable between the inside and the outside of the apparatus main body Sa and cartridges Ca, Cb, Cc, and Cd that are detachably attached to the cartridge support member TR. The cartridge support member TR is moved forward in the front-and-back direction in a state where it supports the cartridges Ca to Cd, thus being moved from the inside to the outside of the apparatus main body Sa. A user can replace the cartridges Ca to Cd in a state where the cartridge support member TR is located outside the apparatus main body Sa.

The cartridges Ca to Cd respectively include the photoconductive drums 10*a* to 10*d*, the charging rollers 11*a* to 11*d*, the developing rollers 12*a* to 12*d*, and the cleaning blades 13*a* to 13*d*. The present disclosure is not limited to this configuration. For example, the cartridge support member TR may include the photoconductive drums 10*a* to 10*d*, and the cartridges Ca to Cd respectively include the developing rollers 12*a* to 12*d*. The cartridge support member TR may include the photoconductive drums 10*a* to 10*d* and the developing rollers 12*a* to 12*d*, and the cartridges Ca to Cd may be toner cartridges that store toner to be supplied to the respective developing rollers 12*a* to 12*d*. Each of the cartridges Ca to Cd may be able to be divided into a plurality of portions.

The image forming unit includes a scanner unit (exposure unit) 20 arranged above the photoconductive drums 10*a* to 10*d*. The exposure unit 20 includes a laser beam source that emits laser beams La, Lb, Lc, and Ld, various optical members that guide the laser beams emitted from the laser beam source to the corresponding photoconductive drums 10*a* to 10*d* to perform deflection scanning, and a housing that accommodates these components. The laser beams La to Ld based on image information are emitted from the exposure unit 20 to the charged photoconductive drums 10*a* to 10*d*, so that electrostatic latent images are formed on the photoconductive drums 10*a* to 10*d*.

The developing rollers 12*a* to 12*d* respectively supply toner to the photoconductive drums 10*a* to 10*d*. Thus, the electrostatic latent images formed on the photoconductive drums 10*a* to 10*d* are developed as toner images. More specifically, the developing rollers 12*a* to 12*d* attach different color (yellow, magenta, cyan, and black) toner respectively to the photoconductive drums 10*a* to 10*d*.

The image forming unit includes an intermediate transfer belt (intermediate transfer member) 15 to which the toner images formed on the photoconductive drums 10*a* to 10*d* are primarily transferred.

The intermediate transfer belt 15 is a belt formed in an annular shape and is stretched around three rollers that are parallel to each other. One of the three rollers is a drive roller, and as the drive roller rotates, the intermediate transfer belt 15 is driven so that its surface moves in a direction of an arrow.

Primary transfer rollers 14*a*, 14*b*, 14*c*, and 14*d* are disposed inside the intermediate transfer belt 15. The intermediate transfer belt 15 is sandwiched between each of the primary transfer rollers 14*a* to 14*d* and each of the photoconductive drums 10*a* to 10*d*. Primary transfer nip portions N1*a*, N1*b*, N1*c*, and N1*d* are formed between the photoconductive drums 10*a* to 10*d* and the intermediate transfer belt 15. The power supply (not illustrated) applies primary transfer bias to the primary transfer rollers 14*a* to 14*d*, so that the toner images on the photoconductive drums 10*a* to 10*d* are transferred to the intermediate transfer belt 15 at the primary transfer nip portions N1*a* to N1*d*.

Thus, the toner images of four colors yellow, magenta, cyan, and black are formed on the intermediate transfer belt 15. Meanwhile, in each of the primary transfer nip portions N1*a* to N1*d*, a part of the toner image is not transferred to the intermediate transfer belt 15 and remains on the photoconductive drums 10*a* to 10*d*.

The toner remaining on the photoconductive drums 10*a* to 10*d* is removed therefrom by the cleaning blades 13*a* to 13*d*.

A secondary transfer roller 16 is disposed downstream of the primary transfer nip portions N1*a* to N1*d* in a driving direction of the intermediate transfer belt 15. A secondary transfer nip portion N2 is formed between the secondary transfer roller 16 and the intermediate transfer belt 15.

Meanwhile, the image forming apparatus S includes a sheet feeding unit 40. The sheet feeding unit 40 can store a plurality of sheets of a recording medium P therein. The recording medium P is conveyed from the sheet feeding unit 40 toward the secondary transfer nip portion N2.

The toner image on the intermediate transfer belt 15 is conveyed to the secondary transfer nip portion N2 by the rotation of the intermediate transfer belt 15. The power supply (not illustrated) applies secondary transfer bias to the secondary transfer roller 16, and the toner image on the intermediate transfer belt 15 is transferred to the recording medium P conveyed to the secondary transfer nip portion N2.

In the secondary transfer nip portion N2, a part of the toner image is not transferred to the recording medium P and remains on the intermediate transfer belt 15. The toner remaining on the intermediate transfer belt 15 is removed therefrom by a belt cleaner (not illustrated).

A fixing device 50 that applies heat and pressure to the recording medium P to fix the toner thereon is provided downstream of the secondary transfer nip portion N2 in a conveyance direction (dashed line arrow direction) of the recording medium P.

The image forming apparatus S includes an exterior frame 4 equipped with a discharged sheet stacking unit 5. The recording medium P that has passed through the fixing device 50 is discharged outside the apparatus main body Sa of the image forming apparatus S by a pair of discharge rollers 60 and is loaded onto the discharged sheet stacking unit 5 provided on the exterior frame 4.

According to the present exemplary embodiment, rotation axis directions of the photoconductive drums 10*a* to 10*d*, the developing rollers 12*a* to 12*d*, the intermediate transfer belt 15, and rollers that convey the recording medium P are parallel to the right-and-left direction. The right-and-left direction can be referred to as a direction orthogonal to the conveyance direction of the recording medium P or a width direction.

External Appearance

An external appearance of the image forming apparatus S is described with reference to FIGS. 1 and 2. FIG. 2 is an external view of the image forming apparatus S.

The apparatus main body Sa of the image forming apparatus S includes the exterior frame 4 made of resin. The exterior frame 4 is roughly box shaped. The exterior frame 4 can be referred to as an external appearance portion of the apparatus main body Sa and accommodates the image forming unit.

The exterior frame 4 includes a top cover 4A. The top cover 4A is disposed on an upper part of the apparatus main body Sa and includes a surface (top surface or upper surface) 4*a*5 that faces outside the image forming apparatus S and upward in the vertical direction. The top cover 4A includes the discharged sheet stacking unit 5 and an attachment portion 70. The attachment portion 70 functions as a unit attachment portion to which an accessory unit 100, which is described below, can be detachably attached.

The top cover 4A is provided with an operation panel 6 as an operation unit.

The top cover 4A has one end (a right end, a first cover end) 4*a*1 and another end (a left end, a second cover end) 4*a*2 opposite to the right end 4*a*1 in the right-and-left direction (width direction). The top cover 4A has one end (front end) 4*a*3 and another end (back end) 4*a*4 opposite to the front end 4*a*3 in the front-and-back direction.

The discharged sheet stacking unit 5 is disposed at a position overlapping with the center of the top cover 4A of the exterior frame 4 in the width direction. The exterior frame 4 of the apparatus main body Sa includes a discharging port 61 through which a recording medium P is discharged from the inside to the outside of the apparatus main body Sa. The recording medium P conveyed by the pair of discharge rollers 60 is discharged from the discharging port 61 toward the discharged sheet stacking unit 5 in a discharge direction D. In other words, the discharging port 61 and the pair of discharge rollers 60 function as a discharge unit that discharges the recording medium P in the discharge direction D toward the discharged sheet stacking unit 5.

The discharged sheet stacking unit 5 includes an inclined surface 5*a* inclined with respect to the horizontal direction. The inclined surface 5*a* has one end (a first surface end) 5*a*1 and another end (a second surface end) 5*a*2. The other end 5*a*2 is on an opposite side of the one end 5*a*1 in the discharge direction D or the front-and-back direction. The other end 5*a*2 is farther from a sheet discharging unit (discharging port 61) than the one end 5*a*1 is from the sheet discharging unit.

In other words, a distance between the other end 5*a*2 and the sheet discharging unit (discharging port 61) is longer than a distance between the one end 5*a*1 and the sheet discharging unit (discharging port 61).

The inclined surface 5*a* is inclined with respect to the horizontal direction so that the other end 5*a*2 is higher than the one end 5*a*1. In other words, the inclined surface 5*a* is inclined upward in the vertical direction from the upstream to the downstream of the discharge direction D. In the top cover 4A, a portion including the discharged sheet stacking unit 5 and the other portions may be formed in one component or may be formed separately in two or more components.

Operation Unit

The image forming apparatus S includes the operation panel 6. The operation panel 6 includes an input unit 6*a* that receives an input operation from a user and an input surface 6*b* including the input unit 6*a*. According to the present exemplary embodiment, the input unit 6*a* is a liquid crystal panel and is a touch panel that functions as a display unit capable of displaying information about the image forming apparatus S and also functions as an operation unit that operates the image forming apparatus S. The input unit 6*a* is not limited to the above-described configuration and may be a button or the like that is independent of a display as the display unit.

The input operation may include an instruction operation for causing the image forming apparatus S to perform a predetermined operation, a control operation for controlling the image forming apparatus S, and a setting operation related to a setting of the image forming apparatus S. Information displayed on the display unit may include information relating to the input operation and information relating to a state of the image forming apparatus S.

The operation panel 6 is disposed on the right side of the discharged sheet stacking unit 5 in a direction orthogonal to the discharge direction D of the recording medium P (width direction). In other words, the operation panel 6 is disposed between the right end 4_a_1 of the top cover 4A and the discharged sheet stacking unit 5 in the width direction orthogonal to the vertical direction and the discharge direction D. The operation panel 6 is disposed forward of the center portion of the top cover 4A of the exterior frame 4 in the front-and-back direction. In other words, the operation panel 6 is closer to the front end 4_a_3 than to the back end 4_a_4 in the front-and-back direction. As described below, the operation panel 6 is connected to a control unit 30 via a cable 82.

A direction in which the input unit 6_a_ faces (a direction in which the input surface 6_b_ faces) is referred to as a front side surface direction 6_c_. The front side surface direction 6_c_ can also be referred to as a direction in which the display unit displays information (display direction) or an exposed direction in which the input unit 6_a_ is exposed. More specifically, the front side surface direction 6_c_ is parallel to the normal direction of the liquid crystal panel as the input unit 6_a_ and the display.

Figure 2:
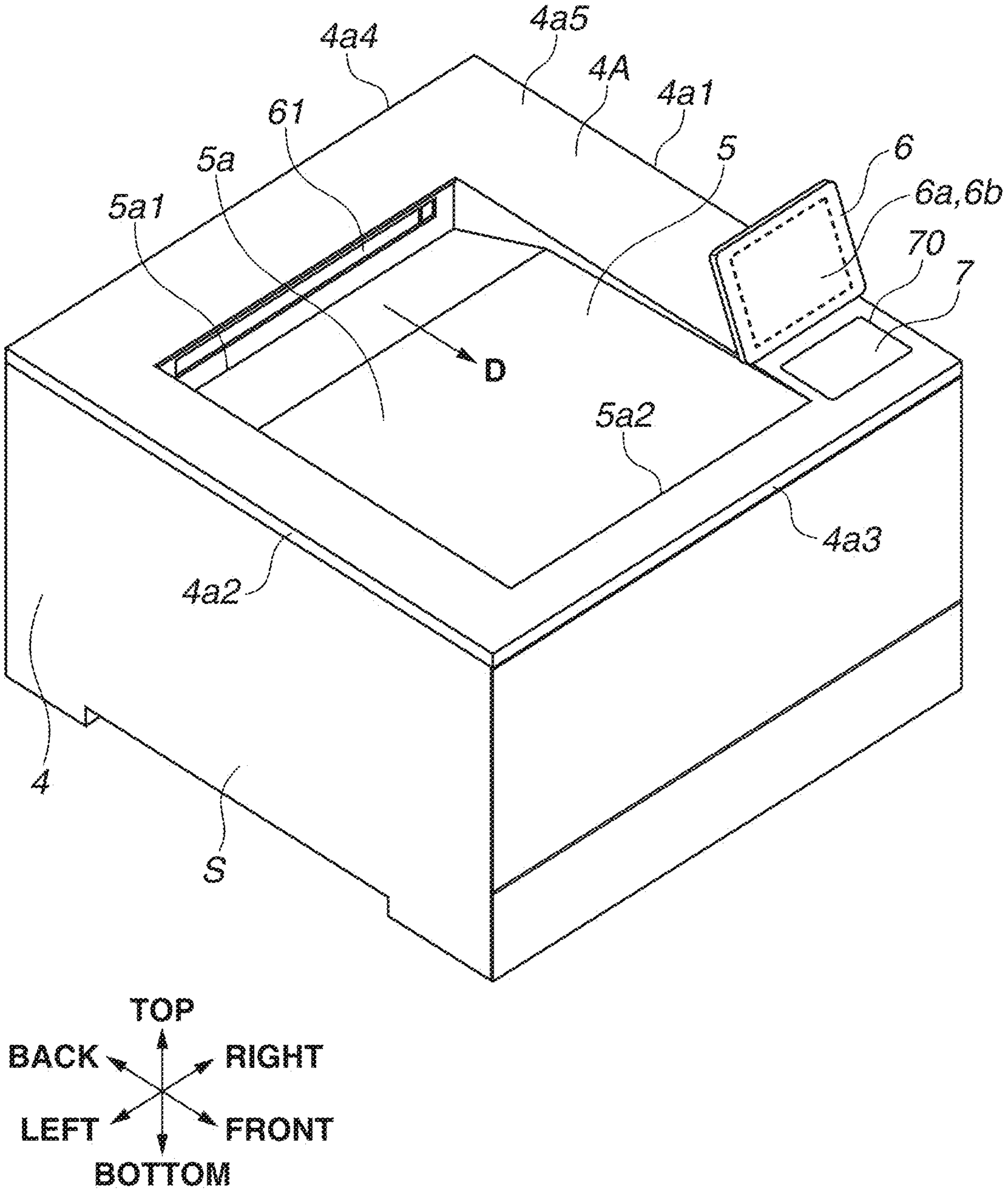
FIG. 2 is an external view of the image forming apparatus.

As illustrated in FIG. 1, the input unit 6_a_ (the input surface 6_b_) faces forward in the front-and-back direction.

The front side surface direction 6_c_ in this state is referred to as a predetermined direction. At this time, an angle between the front side surface direction 6_c_ as the predetermined direction and the horizontal direction (front-and-back direction) is smaller than an angle between the front side surface direction 6_c_ and the vertical direction (up-and-down direction). This state can be referred to as a standing state of the operation panel 6.

As illustrated in FIG. 1, according to the present exemplary embodiment, the operation panel 6 is pivotable with respect to the top cover 4A. The operation panel 6 can take a state where the angle between the front side surface direction 6_c_ and the vertical direction is smaller than the angle between the front side surface direction 6_c_ and the horizontal direction. At this time, the front side surface direction 6_c_ may be parallel to the vertical direction. This state can be referred to as a set state of the operation panel 6. According to the present exemplary embodiment, the front side surface direction 6_c_ of the operation panel 6 in the set state is parallel to the vertical direction.

Attachment Portion

As described below, the image forming apparatus S is configured to be detachably attached to the accessory unit 100 thereto. The attachment portion 70 to which the accessory unit 100 is attached is described below with reference to FIGS. 1 to 5. The image forming apparatus S to which the accessory unit 100 is attached may be referred to as an image forming system or simply as an image forming apparatus.

Figure 3A:
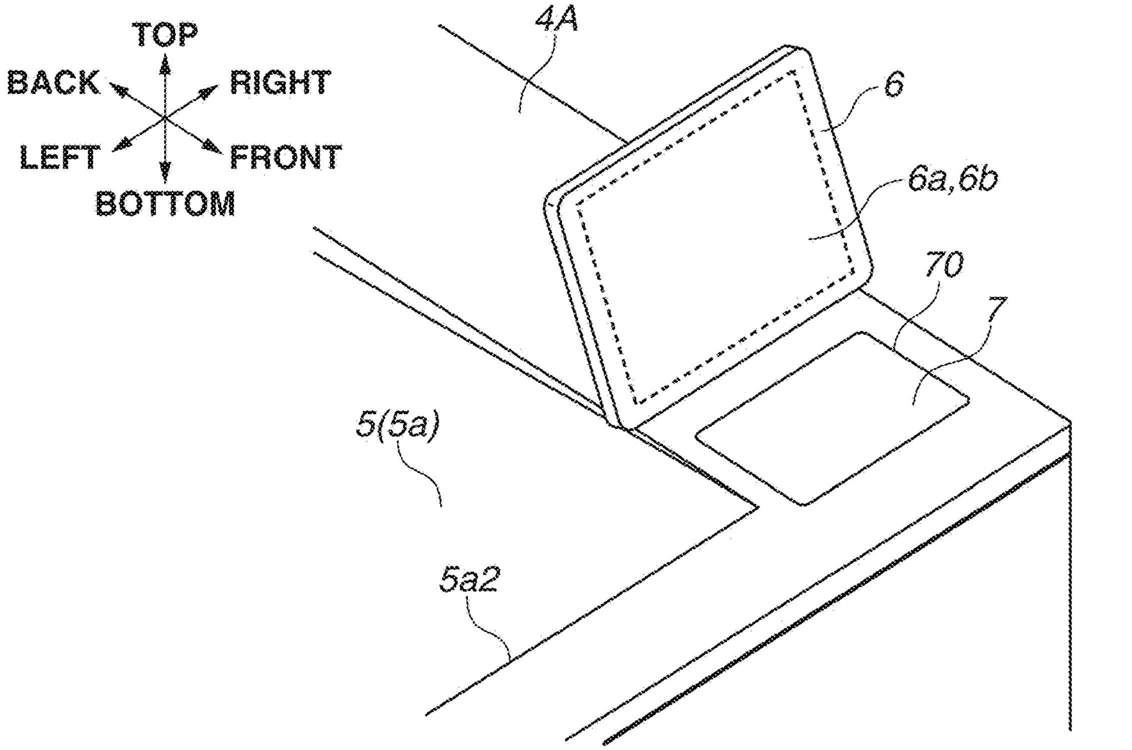
FIG. 3A is an external view of an attachment portion with an attachment portion cover attached thereto.
Figure 3B:
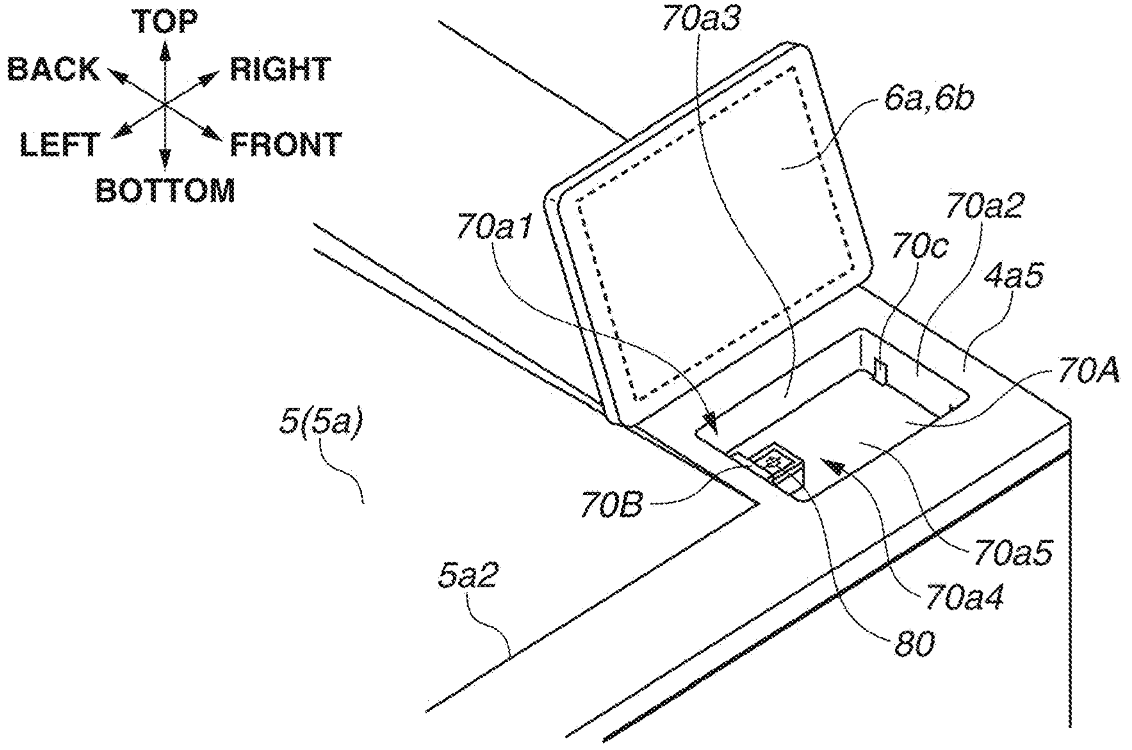
FIG. 3B is an external view of the attachment portion with the attachment portion cover removed therefrom.
Figure 4:
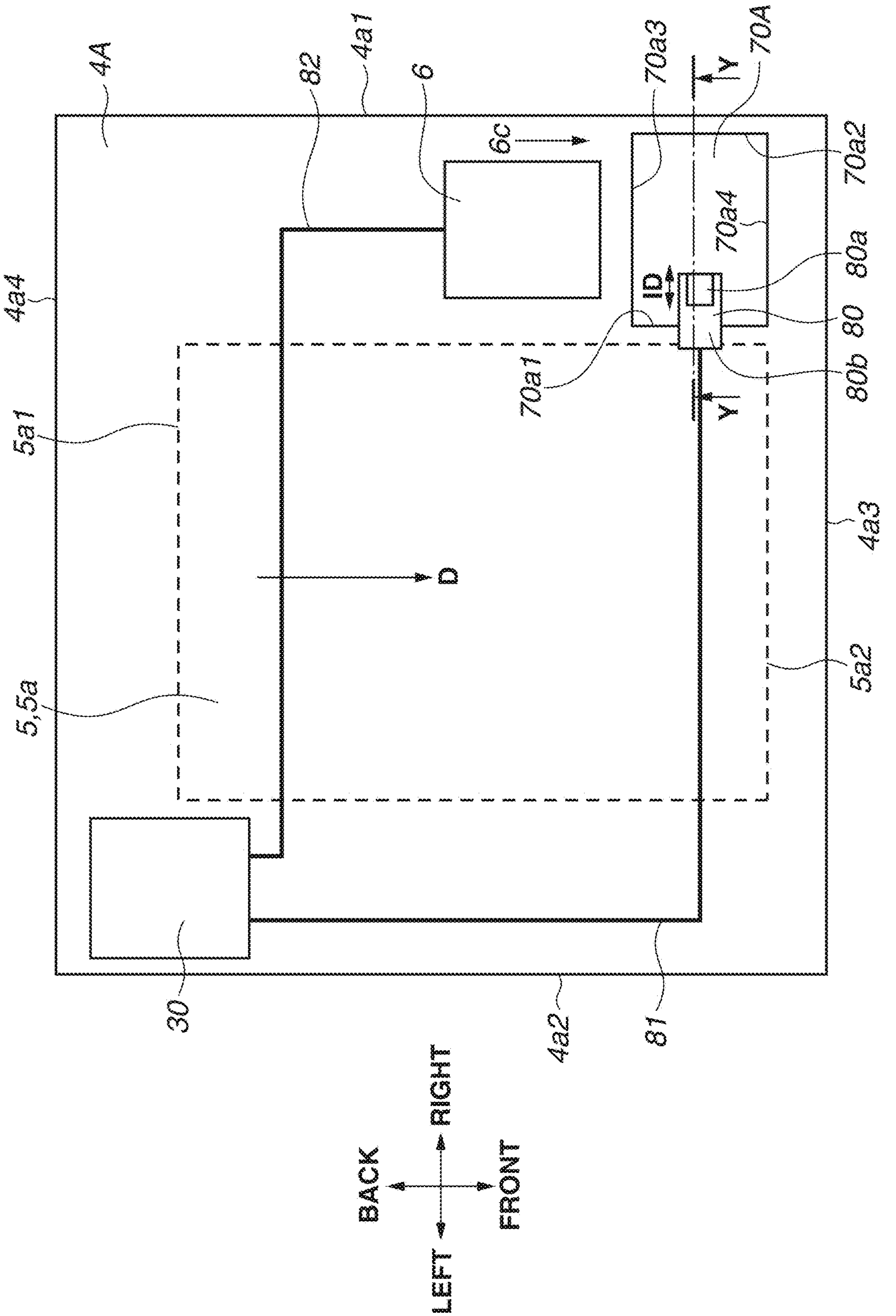
FIG. 4 illustrates an arrangement of an attachment portion, an operation panel, and a control unit.
Figure 5:
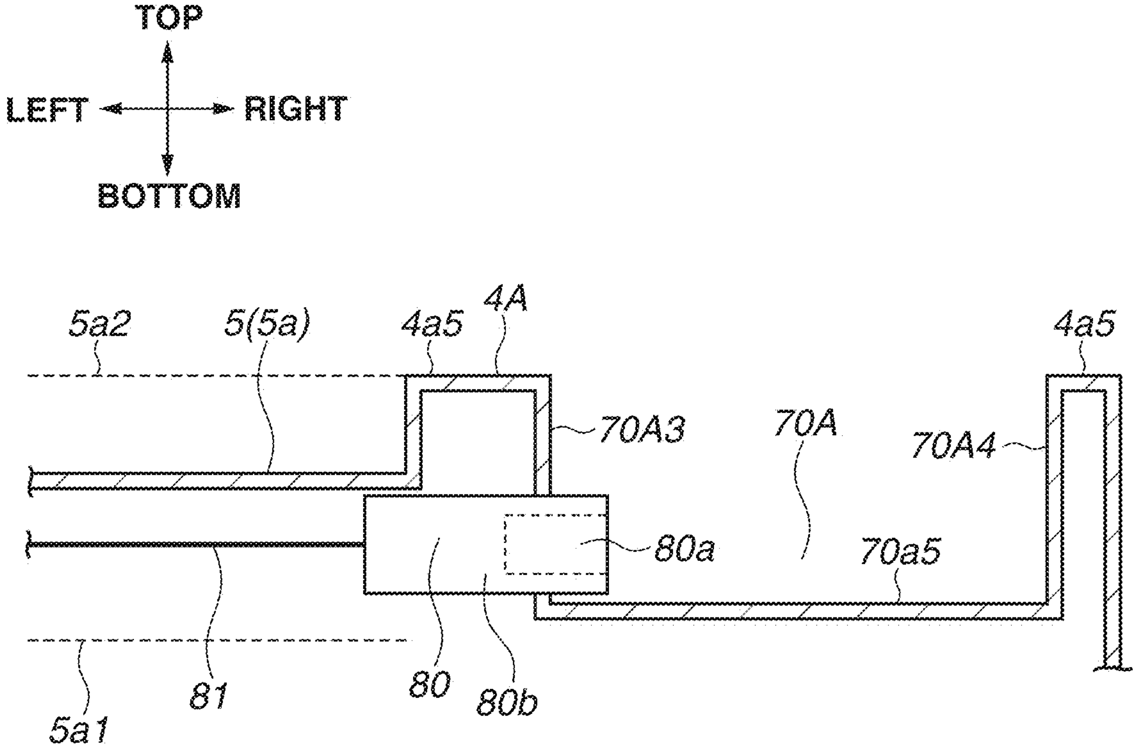
FIG. 5 is a sectional view of the attachment portion.

FIGS. 3A and 3B are external views of the attachment portion 70 and its vicinity. FIG. 3A illustrates the attachment portion 70 with an attachment portion cover 7 attached and 3B illustrates the attachment portion 70 with the attachment portion cover 7 removed. FIG. 4 illustrates an arrangement of the attachment portion 70, the operation panel 6, and the control unit 30. FIG. 4 illustrates the image forming apparatus S viewed in the vertical direction (viewed from above in the up-and-down direction). FIG. 5 is a sectional view of the attachment portion 70. FIG. 5 is a sectional view taken along a line Y-Y in FIG. 4 as viewed in the front-and-back direction.

The attachment portion 70 to which the accessory unit 100 is attachable is disposed between the right end 4_a_1 of the top cover 4A and the discharged sheet stacking unit 5 in the width direction orthogonal to the vertical direction and the discharge direction D.

The attachment portion 70 is disposed adjacent to the operation panel 6 on a front side of the operation panel 6 on the top cover 4A of the exterior frame 4.

Here, the front side refers to a side on which a user can perform main operations on the image forming apparatus S. According to the present exemplary embodiment, the image forming unit IM and the sheet feeding unit 40 is movable to the front side in the front-and-back direction from the inside to the outside of the apparatus main body Sa. As described above, the operation panel 6 can take a posture in which the input surface 6_b_ (the input unit 6_a_) faces the front side. In this way, a user can perform the main operations on the image forming apparatus S from the front side in the front-and-back direction.

As illustrated in FIG. 3B, the attachment portion 70 includes a storage portion 70A, which is a recess space recessed downward from the upper surface 4_a_5 of the top cover 4A. In other words, the attachment portion 70 is a recess portion recessed downward from the upper surface 4_a_5 of the top cover 4A.

The attachment portion 70 has a plurality of walls that form the storage portion 70A, and the plurality of walls includes a first wall 70_a_1, a second wall 70_a_2, a third wall 70_a_3, and a fourth wall 70_a_4. The attachment portion 70 includes a bottom wall 70_a_5 that forms a bottom of the attachment portion 70 (the bottom of the storage portion 70A).

The first wall 70_a_1 and the second wall 70_a_2 extend in a direction intersecting with (desirably, orthogonal to) the width direction. The first wall 70_a_1 and the second wall 70_a_2 face each other in the width direction. In the width direction, the first wall 70_a_1 is closer to the discharged sheet stacking unit 5 than the second wall 70_a_2 is to the discharged sheet stacking unit 5.

As described below, the accessory unit 100 includes an accessory connector 103. As illustrated in FIG. 3B, the image forming apparatus S includes a device connector 80 to which the accessory connector 103 of the accessory unit 100 can be connected. According to the present exemplary embodiment, the device connector 80 is a universal serial bus (USB) port (USB connector) for electrically connecting the accessory unit 100 to the image forming apparatus S. The device connector 80 is disposed in the storage portion 70A of the attachment portion 70. More specifically, the device connector 80 is disposed between the upper surface 4_a_5 and the bottom wall 70_a_5 in the vertical direction (up-and-down direction).

The arrangement of the attachment portion 70 is described in more detail. In FIG. 4, the operation panel 6 is in a state where the input unit 6_a_ (the input surface 6_b_) faces the front side (the standing state of the operation panel 6), and the front side surface direction 6_c_ matches the predetermined direction. The front side surface direction 6_c_ is parallel to the front-and-back direction as viewed in the vertical direction. In this state, the attachment portion 70 is disposed downstream of the operation panel 6 in the front side surface direction 6_c_.

As viewed in the vertical direction, the third wall 70_a_3 of the attachment portion 70 is an end portion (a proximal end) of the attachment portion 70 closest to the operation panel 6 in the front side surface direction 6_c_. At this time, the device connector 80 is farther from the operation panel 6 than the third wall 70_a_3 is from the operation panel 6. According to the present exemplary embodiment, the device connector 80 is disposed on the first wall 70*a*1.

As viewed in the vertical direction, a movement direction in which the sheet feeding unit 40 is moved from the inside to the outside of the apparatus main body Sa is a direction from the back side to the front side in the front-and-back direction. The attachment portion 70 is disposed downstream of the operation panel 6 in the movement direction of the sheet feeding unit 40. As viewed in the vertical direction, the third wall 70*a*3 of the attachment portion 70 is the end portion (proximal end) of the attachment portion 70 closest to the operation panel 6 in the movement direction of the sheet feeding unit 40. At this time, the device connector 80 is farther from the operation panel 6 than the third wall 70*a*3 is from the operation panel 6. As viewed in the vertical direction, the movement direction of the sheet feeding unit 40 is parallel to the front side surface direction 6*c*.

Here, the device connector 80 includes a connector housing 80*b* having a connector hole 80*a*. The connector housing 80*b* extends in a direction intersecting with the front side surface direction 6*c* and the movement direction of the sheet feeding unit 40. The accessory connector 103 of the accessory unit 100 is attachable to and detachable from the connector hole 80*a* in an attachment direction ID. The attachment direction ID is a direction intersecting with the front side surface direction 6*c* and the movement direction of the sheet feeding unit 40.

As viewed in the vertical direction, the movement direction in which the image forming unit IM is moved from the inside to the outside of the apparatus main body S is a direction from the back side to the front side in the front-and-back direction. The attachment portion 70 is disposed downstream of the operation panel 6 in the movement direction of the image forming unit IM. As viewed in the vertical direction, the third wall 70*a*3 of the attachment portion 70 is the end portion (proximal end) of the attachment portion 70 closest to the operation panel 6 in the movement direction of the image forming unit IM. At this time, the device connector 80 is farther from the operation panel 6 than the third wall 70*a*3 is from the operation panel 6. As viewed in the vertical direction, the movement direction of the image forming unit IM is parallel to the front side surface direction 6*c*.

The connector housing 80*b* extends in a direction intersecting with the movement direction of the image forming unit IM. The attachment direction ID is a direction intersecting with the movement direction of the image forming unit IM.

The control unit 30 is connected to the device connector 80. More specifically, the image forming apparatus S includes a cable 81 that connects the control unit 30 and the device connector 80. The cable 81 is connected to the device connector 80.

In a case where the device connector 80 is disposed on the third wall 70*a*3, the attachment portion 70 is to be separated from the operation panel 6 by a predetermined distance to secure a space for arranging the connector housing 80*b* and the cable 81. In contrast, the device connector 80 is farther from the operation panel 6 than the third wall 70*a*3 is to the operation panel 6 as in the present exemplary embodiment, so that the operation panel 6 and the attachment portion 70 can be disposed close to each other.

Arrangement of the device connector 80 on the first wall 70*a*1 prevents upsizing of the exterior frame 4 and the top cover 4A in the right-and-left direction and the front-and-back direction as compared with a case where the device connector 80 is disposed on the second wall 70*a*2 or the fourth wall 70*a*4.

In contrast, in a case where the accessory unit 100 is not attached to the attachment portion 70 as illustrated in FIG. 3A, the attachment portion cover 7 that closes the attachment portion 70 is attached. The attachment portion cover 7 covers the attachment portion 70 to cover the device connector 80. The attachment portion cover 7 is attachable to and detachable from the attachment portion 70.

As illustrated in FIG. 3B, the attachment portion 70 has a support surface 70B and an engagement hole 70C.

If the attachment portion cover 7 is attached, the attachment portion cover 7 is supported by the support surface 70B. An engagement portion of the attachment portion cover 7 is inserted into the engagement hole 70C, so that the attachment portion cover 7 is fixed to the attachment portion 70.

The support surface 70B and the engagement hole 70C are also used to attach and fix the accessory unit 100 to the attachment portion 70.

Next, arrangement and connection of the attachment portion 70, the device connector 80, and the control unit 30 according to the present exemplary embodiment are described.

As illustrated in FIG. 4, in the direction (the width direction) orthogonal to the discharge direction D of the recording medium P, the control unit 30 is disposed on the left side of the discharged sheet stacking unit 5, and the operation panel 6 and the attachment portion 70 are disposed on the right side the discharged sheet stacking unit 5. In the width direction, the control unit 30 is closer to the other end (left end) 4*a*2 of the top cover 4A than to the one end (right end) 4*a*1 of the top cover 4A. In the width direction, the control unit 30 is disposed on the opposite side of the discharged sheet stacking unit 5 from the operation panel 6 and the attachment portion 70.

As illustrated in FIG. 4, the cable 81 overlaps with the inclined surface 5*a* of the discharged sheet stacking unit 5 as viewed in the vertical direction. As viewed in the vertical direction, the connector housing 80*b* of the device connector 80 overlaps with the inclined surface 5*a* of the discharged sheet stacking unit 5. In other words, as illustrated in FIG. 5, a part of the connector housing 80*b* of the device connector 80 and a part of the cable 81 are located directly below the inclined surface 5*a* in the vertical direction.

As illustrated in FIG. 4, the device connector 80 (the connector housing 80*b*) is located between the one end 5*a*1 and the other end 5*a*2 of the inclined surface 5*a* in the orthogonal direction orthogonal to the width direction as viewed in the vertical direction. In other words, as viewed in the vertical direction, the device connector 80 (the connector housing 80*b*) is located between the one end 5*a*1 and the other end 5*a*2 of the inclined surface 5*a* in each of the discharge direction D, the front side surface direction 6*c*, the movement direction of the sheet feeding unit 40, and the movement direction of the image forming unit IM.

Further, as illustrated in FIG. 4, the operation panel 6 is located between the one end 5*a*1 and the other end 5*a*2 of the inclined surface 5*a* in the orthogonal direction orthogonal to the width direction as viewed in the vertical direction. In other words, as viewed in the vertical direction, the operation panel 6 is located between the one end 5*a*1 and the other end 5*a*2 of the inclined surface 5*a* in each of the discharge direction D, the front side surface direction 6*c*, the movement direction of the sheet feeding unit 40, and the movement direction of the image forming unit IM.

As illustrated in FIG. 4, as viewed in the vertical direction, the attachment portion 70 is closer to the other end 5*a*2 than to the one end 5*a*1 of the inclined surface 5*a*. The operation panel 6 is closer to the other end 5*a*2 than to the one end 5*a*1 of the inclined surface 5*a*.

Further, as illustrated in FIG. 5, the device connector 80 (the connector housing 80*b*) is located between the one end 5*a*1 and the other end 5*a*2 of the inclined surface 5*a* in the vertical direction. In other words, the device connector 80 (the connector housing 80*b*) is located higher than the one end 5*a*1 of the inclined surface 5*a* and lower than the other end 5*a*2 of the inclined surface 5*a* in the vertical direction.

As described above, according to the present exemplary embodiment, the discharged sheet stacking unit 5 and the device connector 80 can be arranged in a space-saving manner. According to the present exemplary embodiment, the discharged sheet stacking unit 5, the device connector 80, and the operation panel 6 can be arranged in a space-saving manner.

According to the present exemplary embodiment, the operation panel 6 is connected to the control unit 30. More specifically, the image forming apparatus S includes the cable 82 that connects the control unit 30 and the operation panel 6. As illustrated in FIG. 4, as viewed in the vertical direction, the cable 82 overlaps with the inclined surface 5*a* of the discharged sheet stacking unit 5.

The cables 81 and 82 are connected to the control unit 30 via different routes.

This configuration prevents noise occurring from either the accessory unit 100 or the operation panel 6from affecting the other via the cables 81 and 82.

Electrical Configuration

Figure 6:
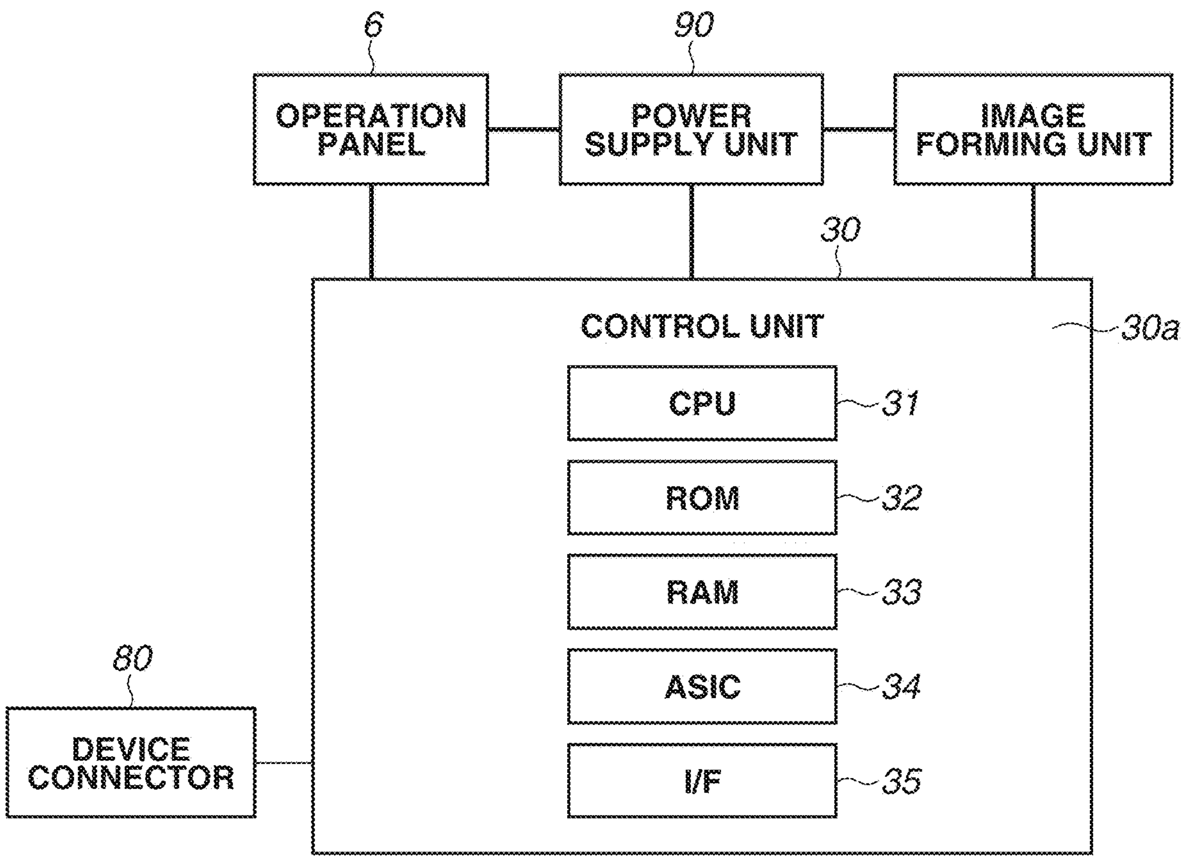
FIG. 6 is a schematic diagram illustrating an electrical configuration of the image forming apparatus.

Next, an electrical configuration of the image forming apparatus S is described with reference to FIG. 6. The image forming apparatus S includes the control unit 30, a power supply unit 90, the image forming unit, and the operation panel 6.

The power supply unit 90 converts voltage and current input from outside the image forming apparatus S into voltage and current used by each unit in the image forming apparatus S and supplies them to each unit in the image forming apparatus S.

The control unit or controller 30 includes a central processing unit (CPU) 31, a read-only memory (ROM) 32, a random access memory (RAM) 33, an application specific integrated circuit (ASIC) 34, an interface 35, and a printed wiring board 30*a* that supports these components. The control unit 30 can also be referred to as a print circuit board including the CPU 31, the ROM 32, the RAM 33, the ASIC 34, the interface 35, and the printed wiring board 30*a*.

The CPU 31 executes a control program stored in the ROM 32 to control an operation of each unit in the image forming apparatus S. The ROM 32 stores the control program to be executed by the CPU 31 and various data. The RAM 33 is a storage device for the CPU 31 to execute various types of processing. The ASIC 34 executes processing different from that to be executed by the CPU 31.

The interface 35 is interface circuitry that connects each unit and the control unit 30.

The cable 81 of the device connector 80 described above is connected to the control unit 30 via the interface 35.

In the control unit 30, the number of each of the CPU 31, the ROM 32, the RAM 33, the ASIC 34, the interface 35, and the printed wiring board 30*a* may be one or more.

Accessory Unit

Figure 7:
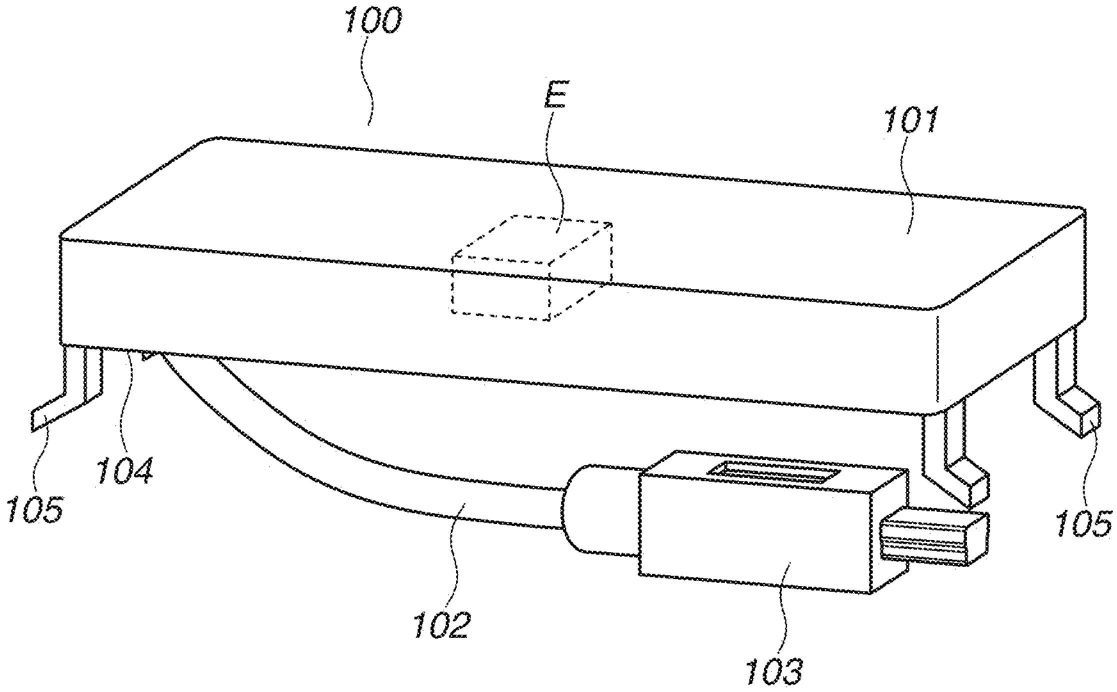
FIG. 7 is an external view of an accessory unit.
Figure 8:
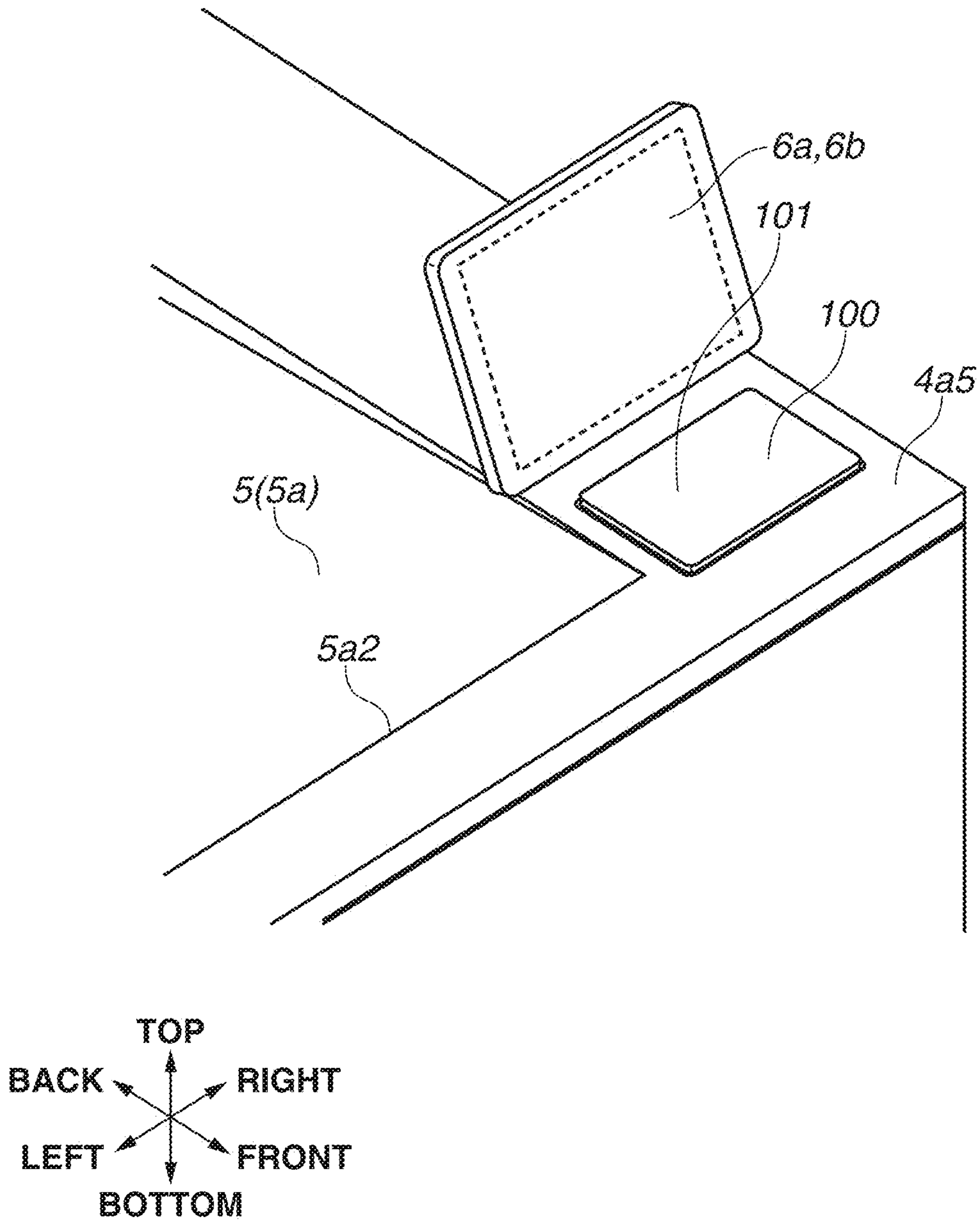
FIG. 8 is an external view of the image forming apparatus with the accessory unit attached thereto.

The accessory unit 100 is described with reference to FIGS. 7 and 8. FIG. 7 is an external view of the accessory unit 100. FIG. 8 is an external view of the image forming apparatus S to which the accessory unit 100 is attached.

A housing 101 accommodates an electronic component E such as circuitry. The accessory connector 103 is connected to the electronic component E accommodated in the housing 101 via a cable 102. The cable 102 is connected to a bottom surface of the housing 101, and the accessory connector 103 is disposed at an end portion of the cable 102. The accessory connector 103 is attachable to and detachable from the connector hole 80*a* of the device connector 80 along the attachment direction ID (see FIG. 4). According to the present exemplary embodiment, the accessory connector 103 is a USB port (USB connector).

An attachment surface 104 and an engaging claw 105 are disposed on a lower part of the housing 101 for attaching, fixing, and locking the accessory unit 100 to the attachment portion 70 of the top cover 4A. If the accessory unit 100 is attached to the attachment portion 70, the attachment surface 104 is brought into contact with the support surface 70B and is supported by the support surface 70B. The engaging claw 105 is inserted into the engagement hole 70C. According to the present exemplary embodiment, the engaging claw 105 is a snap fit that engages with the engagement hole 70C. The above-described attachment portion cover 7 has the same configuration as the attachment surface 104 and the engaging claw 105.

Attachment of the accessory unit 100 to the image forming apparatus S is now described. Initially, a user connects the accessory connector 103 of the accessory unit 100 to the device connector 80 of the image forming apparatus S. Next, the user puts the cable 102 in the storage portion 70A and inserts at least a part of the accessory unit 100 (at least a part of the housing 101) into the storage portion 70A so that the engaging claw 105 of the housing 101 engages with the engagement hole 70C. Thus, the support surface 70B of the attachment portion 70 comes into contact with the attachment surface 104, and the engagement hole 70C engages with the engaging claw 105. The accessory unit 100 is fixed to the top cover 4A of the apparatus main body Sa.

According to the present exemplary embodiment, a part of the housing 101 protrudes upward from the upper surface 4*a*5 of the top cover 4A in a state where the accessory unit 100 is attached to the attachment portion 70.

According to the present exemplary embodiment, the accessory unit 100 is attached to the attachment portion 70, and then the accessory unit 100 can be detached from the attachment portion 70. After detachment of the accessory unit 100 from the attachment portion 70, the attachment portion cover 7 can be attached to the attachment portion 70. Further, after attachment of the attachment portion cover 7 to the attachment portion 70, the attachment portion cover 7 can be detached from the attachment portion 70. After detachment of t the attachment portion cover 7 from the attachment portion 70, the accessory unit 100 can be attached to the attachment portion 70.

The accessory unit (accessory) 100 according to the present exemplary embodiment can also be referred to as an extension unit that extends a function of the image forming apparatus S. As an example of the accessory unit 100, the accessory unit 100 according to the present exemplary embodiment may be a wireless print accessory. The accessory unit 100 includes an antenna, a wireless communication module including wireless circuitry, peripheral circuitry, and control circuitry, and interface circuitry as the electronic components E accommodated inside the housing 101.

The image forming apparatus S is connected to the accessory unit 100 and thus becomes capable of performing wireless communication. Examples of wireless communication methods include short-range wireless communication using Wireless Fidelity (Wi-Fi®), Bluetooth®, and near field communication (NFC). The image forming apparatus S has a wireless communication function and thus can receive image data from a peripheral terminal, such as a smartphone, via wireless communication, thus executing a printing operation based on the image data.

Examples of the accessory unit 100 include an apparatus having the above-described wireless communication function, as well as an input apparatus (e.g., a keypad such as numeric keys), an authentication apparatus (e.g., a card reader and a barcode reader), and an apparatus having a function other than those. The accessory unit 100 includes components to be used for its function and is connected to the control unit 30 via the accessory connector 103 and the device connector 80. Thus, the control unit 30 and the accessory unit 100 can transmit a predetermined signal therebetween. Accordingly, the control unit 30 can execute control of the accessory unit 100, an operation of the image forming apparatus S based on the signal received from the accessory connector 103, and the like.

The attachment portion 70 is disposed adjacent to the operation panel 6 on the front side of the operation panel 6 disposed on the top cover 4A of the exterior frame 4. The accessory unit 100 is attached to the attachment portion 70 of the image forming apparatus S and thus is disposed adjacent to the operation panel 6 on the front side of the operation panel 6 disposed on the top cover 4A of the exterior frame 4.

Arrangement of the attachment portion 70 on the front side of the operation panel 6 prevents degradation in the visibility of the attachment portion 70 and the accessory unit 100 due to the operation panel 6. Thus, the user can easily recognize whether the accessory unit 100 is attached and a type and a state of the accessory unit 100 attached to the attachment portion 70.

The arrangement of the accessory unit 100 on the front side of the operation panel 6 prevents the operation panel 6 from hindering an operation on the accessory unit 100. Examples of operations on the accessory unit 100 include an operation of bringing a terminal close to the accessory unit 100 in a case where the accessory unit 100 has a short-range wireless communication function. Other examples of operations include an input operation in a case where the accessory unit 100 is an input apparatus, and an operation of bringing an object to be used for authentication close to the accessory unit 100 in a case there the accessory unit 100 has a predetermined authentication function. The accessory unit 100 is disposed in front of the operation panel 6, so that these operations can be prevented from being hindered by the operation panel 6.

The operation panel 6 may be configured to display information relating to the accessory unit 100. The information relating to the accessory unit 100 may include a connection state to the accessory unit 100, information relating to a state of the accessory unit 100, and information relating to an operation performed on the accessory unit 100.

The arrangement of the accessory unit 100 near the operation panel 6 reduces a movement of a user's line of sight between the accessory unit 100 and the operation panel 6. This enables the user to easily visually recognize the information displayed on the operation panel 6. The user can easily perform an operation on the accessory unit 100 while viewing the displayed information.

According to the present exemplary embodiment, an upper surface of the housing 101 of the accessory unit 100 and an upper surface of the attachment portion cover 7 are located lower than the input unit 6*a* of the operation panel 6. Thus, the accessory unit 100 and the attachment portion cover 7 are prevented from interfering with an input operation performed on the operation panel 6 and from reducing visibility of display on the operation panel 6.

Next, a second exemplary embodiment is described with reference to FIGS. 9A and 9B. According to the second exemplary embodiment, configurations similar to those described in the first exemplary embodiment are denoted by the same reference numerals, and detailed descriptions are omitted in principle.

Figure 9A:
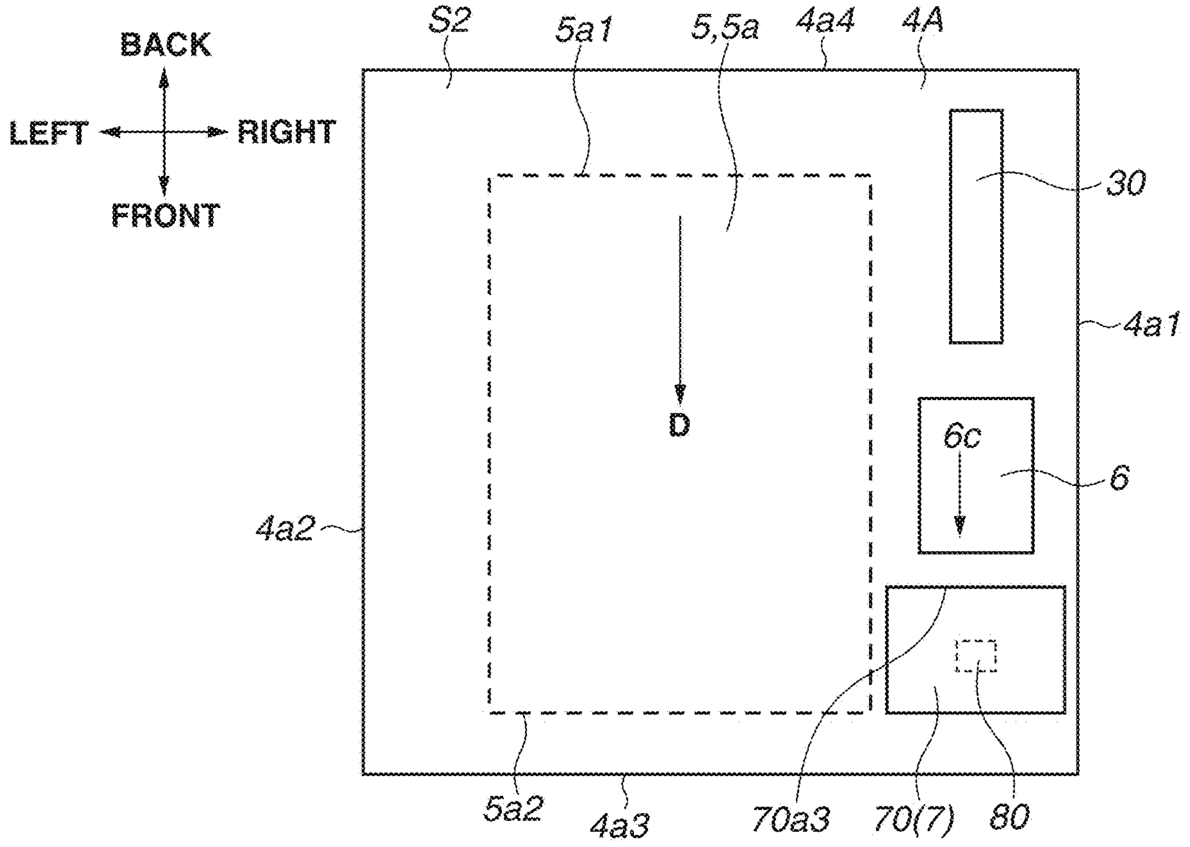
FIG. 9A illustrates an image forming apparatus according to a second exemplary embodiment viewed in a vertical direction.
Figure 9B:
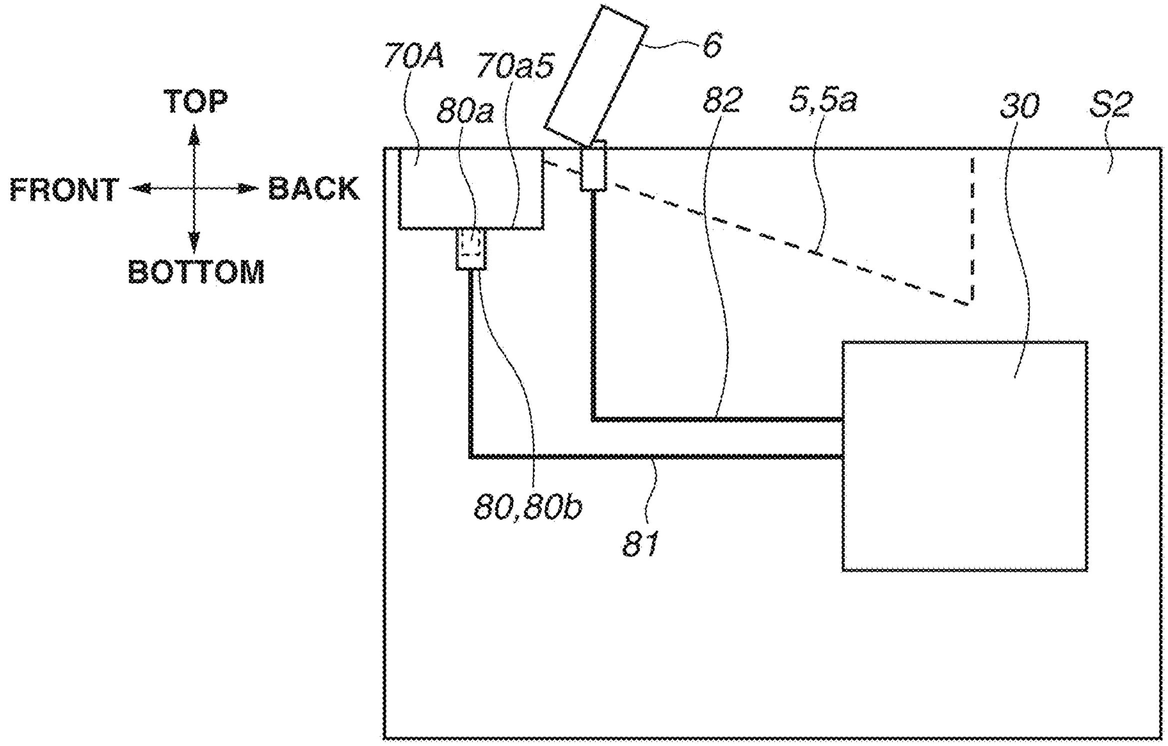
FIG. 9B illustrates the image forming apparatus viewed in a right-and-left direction.

FIGS. 9A and 9B illustrate an image forming apparatus S2 according to the second exemplary embodiment. FIGS. 9A and 9B respectively illustrate the image forming apparatus S2 viewed in the vertical direction and in the right-and-left direction.

An arrangement relationship among the operation panel 6, the attachment portion 70, and the discharged sheet stacking unit 5 according to the second exemplary embodiment is similar to that according to the first exemplary embodiment. According to the second exemplary embodiment, an arrangement of the device connector 80 and an arrangement of the control unit 30 with respect to the operation panel 6, the attachment portion 70, and the discharged sheet stacking unit 5 are different from those according to the first exemplary embodiment.

According to the first exemplary embodiment, the control unit 30 is disposed on an opposite side of the discharged sheet stacking unit 5 from the operation panel 6 and the attachment portion 70 to which the accessory unit 100 is attached. Further, the device connector 80 for electrically connecting the accessory unit 100 to the image forming apparatus S is disposed on the first wall 70*a*1 among the plurality of walls forming the storage portion 70A.

In contrast, according to the second exemplary embodiment, the control unit 30 is closer to the one end (right end) 4*a*1 than to the other end (left end) 4*a*2 of the top cover 4A in the width direction (right-and-left direction) as illustrated in FIG. 9A. In other words, as illustrated in FIGS. 9A and 9B, the control unit 30 is disposed on the same side of the discharged sheet stacking unit 5 as the side on which the operation panel 6 and the attachment portion 70 are disposed, where the accessory unit 100 is attached to the attachment portion 70 in the width direction. According to the present exemplary embodiment, the control unit 30, the operation panel 6, and the attachment portion 70 to which the accessory unit 100 is attached are disposed on the right side of the discharged sheet stacking unit 5 in the width direction. The configuration according to the present exemplary embodiment can shorten lengths of the cables 81 and 82 as compared with the configuration according to the first exemplary embodiment.

The device connector 80 for connecting the accessory unit 100 is disposed on the bottom wall 70*a*5, which is the bottom of the storage portion 70A. As viewed in the vertical direction, the device connector 80 is farther from the operation panel 6 than the third wall 70*a*3 is from the operation panel 6 in the front-and-back direction. The connector housing 80*b* is disposed to extend downward from the bottom wall 70*a*5 in the vertical direction. The accessory connector 103 of the accessory unit 100 is attached to and detached from the connector hole 80*a* along the up-and-down direction.

The cable 81 is connected to a lower part of the connector housing 80*b* and is disposed to extend along the up-and-down direction. The cable 82 to be connected to the operation panel 6 is also disposed to extend along the up-and-down direction. The cables 81 and 82 are connected to the control unit 30 via the different routes. This configuration prevents noise occurring from either the accessory unit 100 or the operation panel 6 from affecting the other via the cables 81 and 82.

Other Exemplary Embodiments (1) According to each of the exemplary embodiments described above, the operation panel 6 and the attachment portion 70 are disposed on the right side of the discharged sheet stacking unit 5, but the operation panel 6 and the attachment portion 70 to be attached may be disposed on the left side of the discharged sheet stacking unit 5.

(2) The device connector 80 may be disposed at a position different from that according to the exemplary embodiments described above. In other words, the device connector 80 may be disposed on any of the first wall 70*a*1, the second wall 70*a*2, the fourth wall 70*a*4, and the bottom wall 70*a*5 of the attachment portion 70 excluding the third wall 70*a*3.

(3) According to the exemplary embodiments described above, the connection between the image forming apparatus S and the accessory unit 100 is based on the USB standard, but may be based on other standards.

(4) According to each of the exemplary embodiments described above, the number of the accessory units 100 to be attached to the image forming apparatus S is one, but a plurality of accessory units may be attachable to the image forming apparatus S. In this case, an attachment portion to which another accessory unit is attached may be disposed at a position different from the attachment portion 70 described according to the exemplary embodiments described above.

(5) According to the exemplary embodiments described above, the image forming apparatus S is described using an electrophotographic type color laser beam printer as an example. However, the present disclosure may be applied to a single-color laser beam printer and an ink jet printer. The present disclosure may also be applied to a light-emitting diode (LED) printer that uses light-emitting diodes as an exposure device.

(6) According to the exemplary embodiments described above, the image forming apparatus S is described using a single-function printer having only an image forming function as an example. However, the present disclosure may be applied to a multifunction printer that is disposed with an image reading apparatus and has a plurality of functions such as an image reading function and an image transmitting function in addition to an image forming function.

As described above, according to the present disclosure, an image forming apparatus can be provided in which the operation panel 6 and the attachment portion 70 to which the accessory unit 100 is attached (the attachment portion 70 in which the device connector 80 is disposed) are suitably arranged.

As described above, according to the present disclosure, an image forming apparatus can be provided in which an operation unit and an attachment portion are suitably arranged. According to the present disclosure, an image forming apparatus can be provided in which an operation unit and a portion in which a connector connected to a control unit is disposed are suitably arranged.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2023-144454, filed Sep. 6, 2023, which is hereby incorporated by reference herein in its entirety.

What is claimed is:

1. An image forming apparatus to which an accessory unit including an accessory connector is detachably attached, the image forming apparatus comprising:

a top cover including a stacking unit on which a recording medium is to be stacked, an upper surface facing upward in a vertical direction, and a unit attachment portion to which the accessory unit is attachable;

a device connector to which the accessory connector is connectable, the device connector being disposed on the unit attachment portion;

a discharge unit configured to discharge the recording medium in a discharge direction toward the stacking unit;

an operation unit including an input unit configured to receive an input operation; and a control unit connected to the device connector, wherein the top cover includes a first cover end and a second cover end opposite to the first cover end with respect to a width direction orthogonal to the vertical direction and the discharge direction, and the operation unit and the unit attachment portion are disposed between the first cover end and the stacking unit in the width direction, wherein the unit attachment portion is disposed downstream of the operation unit in a predetermined direction as viewed in the vertical direction in a state where the input unit faces the predetermined direction, and wherein the unit attachment portion has a plurality of walls that forms a recess portion recessed downward from the upper surface, the plurality of walls includes a first wall and a second wall that extend in a direction intersecting with the width direction, the first wall is closer to the stacking unit than the second wall is to the stacking unit in the width direction, and the device connector is disposed on the first wall.

2. The image forming apparatus according to claim 1, wherein, as viewed in the vertical direction, in a case where an end portion of the unit attachment portion closest to the operation unit in the predetermined direction is defined as a proximal end, the device connector is farther from the operation unit than the proximal end is from the operation unit.

3. The image forming apparatus according to claim 1, wherein the control unit is closer to the second cover end than to the first cover end in the width direction.

4. The image forming apparatus according to claim 3, wherein, as viewed in the vertical direction, a cable connecting the device connector and the control unit overlaps with the stacking unit.

5. The image forming apparatus according to claim 1, wherein, as viewed in the vertical direction, the device connector overlaps with the stacking unit.

6. The image forming apparatus according to claim 5,
wherein the stacking unit has an inclined surface inclined with respect to a horizontal direction, the inclined surface includes a first surface end and a second surface end opposite to the first surface end with respect to the vertical direction, and the second surface end is higher than the first surface end, and
wherein, as viewed in the vertical direction, the second surface end is farther from the discharge unit than the first surface end is from the discharge unit in an orthogonal direction orthogonal to the width direction, and the operation unit and the unit attachment portion are closer to the second surface end than to the first surface end.

7. The image forming apparatus according to claim 6, wherein, as viewed in the vertical direction, the device connector is disposed between the second surface end and the first surface end in the orthogonal direction.

8. The image forming apparatus according to claim 1, wherein the control unit is closer to the first cover end than to the second cover end in the width direction.

9. The image forming apparatus according to claim 1,
wherein the stacking unit has an inclined surface inclined with respect to a horizontal direction, the inclined surface includes a first surface end and a second surface end opposite to the first surface end with respect to the vertical direction, and the second surface end is higher than the first surface end, and
wherein, as viewed in the vertical direction, the second surface end is farther from the discharge unit than the first surface end is from the discharge unit in an orthogonal direction orthogonal to the width direction, and the operation unit and the unit attachment portion are closer to the second surface end than to the first surface end.

10. The image forming apparatus according to claim 9, wherein, as viewed in the vertical direction, the device connector is disposed between the second surface end and the first surface end in the orthogonal direction.

11. An image forming apparatus comprising:
a top cover including a stacking unit on which a recording medium is to be stacked, an upper surface facing upward in a vertical direction, and a recess portion recessed downward from the upper surface;
a discharge unit configured to discharge the recording medium in a discharge direction toward the stacking unit;
an operation unit including an input unit configured to receive an input operation;
a connector disposed on the recess portion;
a control unit connected to the connector; and
a cover covering the recess portion to cover the connector,
wherein the top cover includes a first cover end and a second cover end opposite to the first cover end with respect to a width direction orthogonal to the vertical direction and the discharge direction, and the operation unit and the recess portion are disposed between the first cover end and the stacking unit in the width direction,
wherein the recess portion is disposed downstream of the operation unit in a predetermined direction as viewed in the vertical direction in a state where the input unit faces the predetermined direction, and
wherein the top cover has a plurality of walls that forms the recess portion, the plurality of walls includes a first wall and a second wall that extend in a direction intersecting with the width direction, the first wall is closer to the stacking unit than to the second wall in the width direction, and the connector is disposed on the first wall.

12. The image forming apparatus according to claim 11, wherein, as viewed in the vertical direction, in a case where an end portion of the recess portion closest to the operation unit in the predetermined direction is defined as a proximal end, the connector is farther from the operation unit than the proximal end is from the operation unit.

13. The image forming apparatus according to claim 11, wherein the control unit is closer to the second cover end than to the first cover end in the width direction.

14. The image forming apparatus according to claim 13, wherein, as viewed in the vertical direction, a cable connecting the connector and the control unit overlaps with the stacking unit.

15. The image forming apparatus according to claim 11, wherein, as viewed in the vertical direction, the connector overlaps with the stacking unit.

16. The image forming apparatus according to claim 11,
wherein the stacking unit has an inclined surface inclined with respect to a horizontal direction, the inclined surface includes a first surface end and a second surface end opposite to the first surface end with respect to the vertical direction, and the second surface end is higher than the first surface end, and
wherein, as viewed in the vertical direction, the second surface end is farther from the discharge unit than the first surface end is from the discharge unit in an orthogonal direction orthogonal to the width direction, and the operation unit and the recess portion are closer to the second surface end than to the first surface end.

17. The image forming apparatus according to claim 16, wherein, as viewed in the vertical direction, the connector is disposed between the second surface end and the first surface end in the orthogonal direction.

* * * * *